United States Patent [19]
Home

[11] Patent Number: 5,140,973
[45] Date of Patent: Aug. 25, 1992

[54] BARBECUE GRILL TROLLEY

[75] Inventor: William Home, Taipei, Taiwan

[73] Assignee: Grand Hall Enterprise Co., Ltd., Taipei, Taiwan

[21] Appl. No.: 679,634

[22] Filed: Apr. 2, 1991

[51] Int. Cl.⁵ ............................................. F24C 3/00
[52] U.S. Cl. .................... 126/41 R; 126/25 R; 99/449; 108/64; 248/129
[58] Field of Search ............... 126/41 R, 25 R, 25 A, 126/38, 39 B, 50; 108/115, 146, 56, 64; 211/189, 182, 175; 248/129, 172; 99/449

[56] References Cited
U.S. PATENT DOCUMENTS

| | | | |
|---|---|---|---|
| 3,306,280 | 2/1967 | Vannoy | 126/25 R |
| 3,369,482 | 2/1968 | Kahn et al. | 126/25 R X |
| 4,677,964 | 7/1987 | Lohmeyer et al. | 126/41 R |
| 4,895,131 | 1/1990 | Overholser | 126/25 R X |
| 4,949,701 | 8/1990 | Krosp et al. | 126/41 R |
| 4,984,515 | 1/1991 | Pivonka | 126/25 R X |

Primary Examiner—Larry Jones
Attorney, Agent, or Firm—Dellet, Smith-Hill and Bedell

[57] ABSTRACT

A retractable barbecue grill trolley has a first plate and a second plate pivotally linked thereto to form a foldable base plate and four legs pivotally attached to the base plate. Each leg has an upper and a lower post connected by a leaf spring deposited in the lower post. Each upper post has an fixing mechanism to be fixed by a pivotal supporting beam having a plurality of threading holes.

1 Claim, 4 Drawing Sheets 5,140,973

BARBECUE GRILL TROLLEY

BACKGROUND OF THE INVENTION

This invention relates to a barbecue grill trolley, especially to a retractable and foldable barbecue grill trolley.

Traditionally, a barbecue grill trolley used in a yard occupies a lot of space and is not easily moved. If a user wishes to alter a position of the barbecue, a lot effort is necessary because of the large size of the entire trolley. Further, when a user intends to transport the trolley over a long distance for a picnic, he has to disassemble the trolley to move all elements by vehicle. When the user reaches to a destination, it is necessary to re-assemble all elements again. Therefore, it is inconvenient to use a conventional barbecue grill trolley for distant transportation.

Additionally, if there are many user roasting food on a burner, it is necessary to supply another burner. In a conventional barbecue grill trolley, there is not space for a second burner. Thus, the user has to supply two grills to meet the requirements. It is redundant under normal conditions and expensive.

Furthermore, because of the large size of the trolley, the shipping cost is substantially high from the manufacture to the retailer or customer.

It is the purpose of this present invention, therefore, to mitigate and/or obviate the abovementioned drawback in the manner set forth in the detailed description of the preferred embodiment.

SUMMARY OF THE INVENTION

This invention provides a barbecue grill trolley which is combined by a foldable base plate for carrying a gas container, four retractable legs pivotally mounted to the base plate, a pair of wheels, transverse bars, and control panels. It is easy to alter a position of the grill by slightly raising the grill and then moving because of the wheels.

When a user intends to transport the grill, he merely disassembles the control panels, retracts the legs, and folds the base plate, such that the size of the grill is reduced to that of the individual elements of the grill. This will be very convenient for moving or storage. The shipping cost for delivering the trolley is also reduced.

In addition, this invention has an angular fixing means on an upper portion of each leg. Each fixing means engages with a pivotal supporting beam which is capable of being folded up and fixed in a horizontal direction and has a plurality of threaded holes thereon. A preparation board crossing a transverse side of the grill has a plurality of threaded holes on a bottom surface thereof corresponding to that of the supporting beam so as to be threaded on the supporting bars. This invention also provides a spare burner which has threaded holes as those of the preparation board. Therefore, it is easily to replace the preparation board by the spare gas burner.

The main purpose of this invention is to provide a barbecue grill trolley which is retractable and foldable.

A further purpose of this invention is to provide a barbecue grill trolley which is retractable and foldable.

A further purpose of this invention is to provide a barbecue grill trolley which is eacy to transport. Another purpose of this invention is to provide a barbecue grill trolley which is capable of adjusting a height of the trolley.

DETAILED DESCRIPTION OF THE PREFERRED EMBODIMENT

Figure 1:
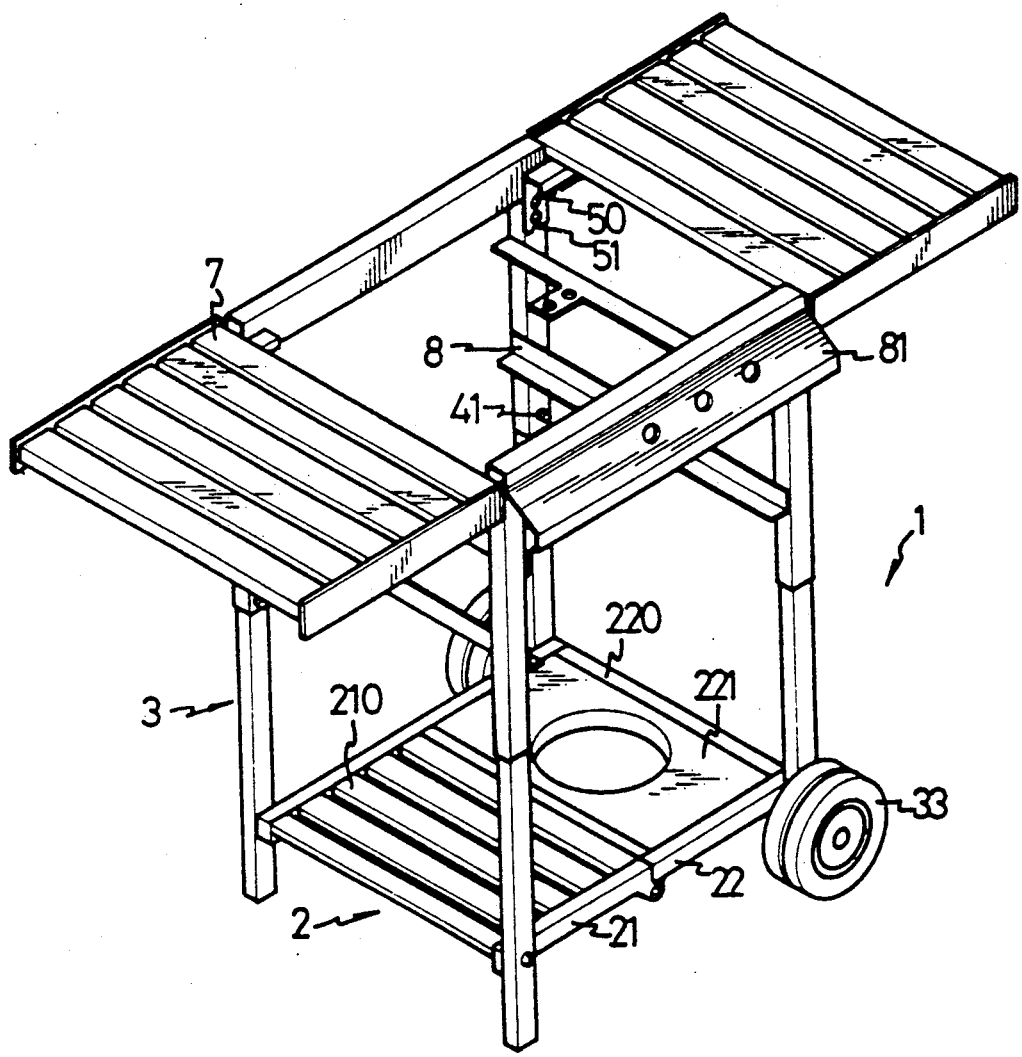
FIG. 1 is a perspective view of a barbecue grill trolley in accordance with the present invention.
Figure 2:
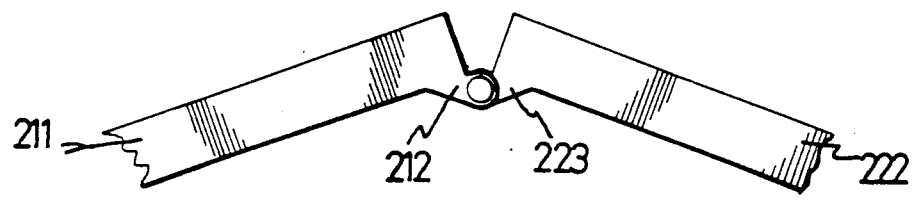
FIG. 2 is a partially enlarged view illustrating a base plate of a trolley according to the present invention.

Referring to FIGS. 1 and 2, a barbecue grill trolley 1 has a base plate 2, which comprises a first and a second rectangular plate 21 and 22. The first rectangular plate 21 has a plurality of strips 210 parallel to each other. The second rectangular plate 22 comprises a frame 220 and a releasable plate 221, which has a hole therein for holding a gas container. When the releasable plate 221 is removed, the gas container may be laid across the frame 220 so as to perform a stabilizing function.

The rectangular plates 21 and 22 have downward peripheral flange 211 and 222, respectively. There is a fixing plate 212 protruding from a lower portion of the flange 211 at both lateral sides of the first plate 21, with the second plate 22 having a similar fixing plate 223. Each fixing plate 212 and 223 has a hole therein, thus the first and second rectangular plate 21 and 22 may be pivotally linked by a bolt or rivet.

Figure 3:
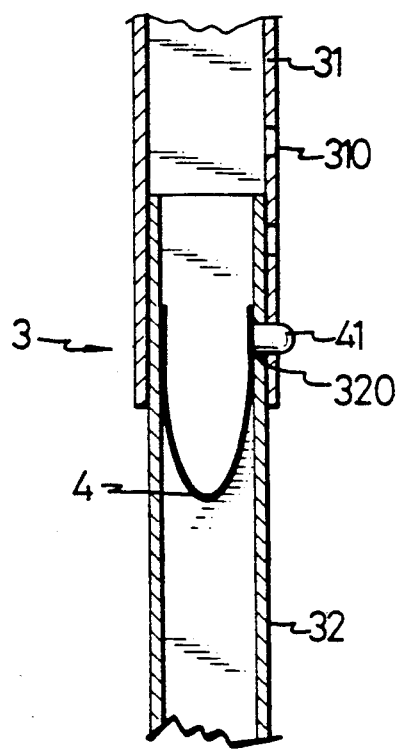
FIG. 3 is a longitudinal cross-sectional view showing a spring means deposited in a leg of a trolley.

Referring to FIGS. 1 and 3, the trolley has four legs 3 pivotally attached on each corner of the base plate 2. One pair of the legs 3 are attached with a pair of wheels 33. Each leg 3 has an upper and a lower post 31 and 32, the upper post 31 being capable of receiving the lower post 32 and having a plurality of fixing holes 310 therein. The lower post 32 has a fixing hole 320 in an upper portion thereof. A hooked leaf spring 4 is deposited in the lower post 32 and has a projection 41 on an end thereof protruding from the fixing hole 320 of the lower post 32, such that when the upper post 31 slides along the lower post 32, the projection 41 is urged into the fixing holes 310 of the upper post 31 by force of the spring 4, to combine the upper and lower posts.

It should be noted that the projection 41 is retractable so as to alter a height of the trolley as desired.

Figure 4:
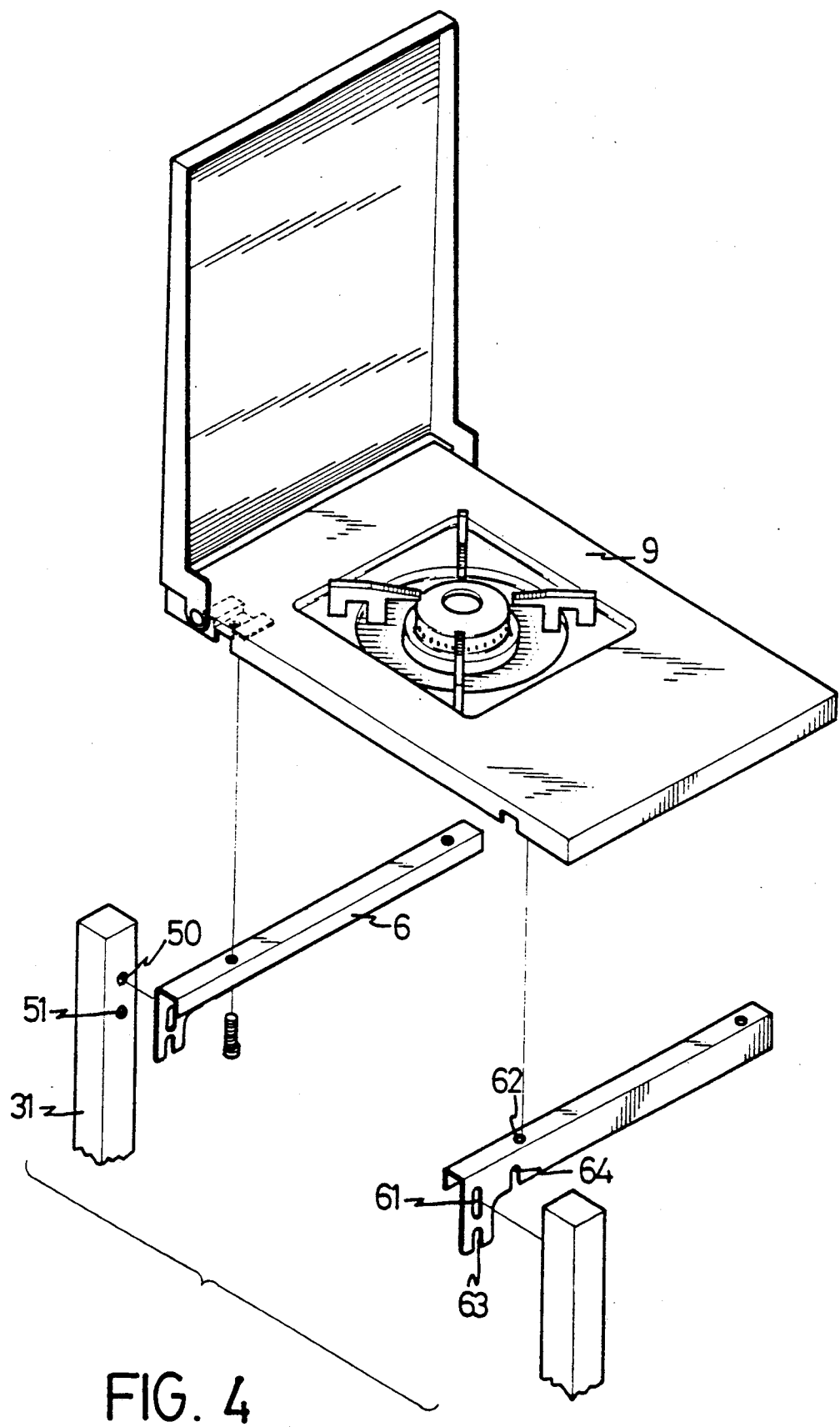
FIG. 4 is a partially enlarged exploded view illustrating a fixing means of a trolley.

Referring to FIG. 4, on an upper portion of the upper post 31, there is provided a fixing means 5 which comprises two pins 50 and 51 fixedly mounted on the upper post 31. A supporting beam 6 has a slot 61 for pivotally engaging with the pin 50 and two fixing recesses 63 and 64. When the supporting beam 6 in a folded-down condition the fixing recess 64 may receive the pin 51 for fixation. While the supporting beam 6 is pivotally raised about the pin 50 to a horizontal position, the fixing recess 63 may be engaged with the pin 51 to maintain the supporting beam 6 in a horizontal position.

Each supporting beam 6 has an inverted U-shaped cross section and provides two threaded holes 62 therein. There is provided a preparation board 7 which has a plurality of threaded holes on a bottom surface thereof to be threaded to a pair of supporting beams 6.

A pair of strips 8 are mounted across the transverse side of the trolley to the legs 3. There is provided a pair of fixing plates on the upper strip 8 for carrying a barbecue grill or a gas burner. A control panel 81 is releasably attached to the upper posts.

A spare gas burner 9 is provided and has a plurality of threaded holes corresponding to that of the preparation board 7, such that the spare gas burner 9 may be threaded onto the supporting beam 6 to replace the preparation board 7.

Figure 5:
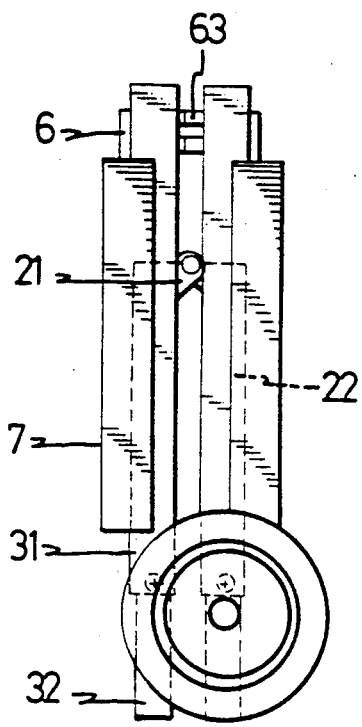
FIG. 5 is a side view of a barbecue grill trolley embodying the present invention in a folded and retracted condition.

Referring to FIG. 5, when the trolley 1 is packed to be transported, the supporting bars 6 may be disengaged from the pin 51 and lowered in a downward direction, with the control panel 81 being released and removed. Then the projecting 41 may be depressed to descend the upper post 31 along the lower post 32. The base plate 2 is folded to make the first and second rectangular plates 21 and 22 parallel and nearly flush with each other. Thus, the space of the trolley 1 is reduced to facilitate transporting or packaging of the trolley.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

I claim:
1. A retractable barbecue grill trolley comprising:
a first set and a second set of posts each having an upper end and a lower end;
two side supporting assemblies, each being attached to one of said sets of posts and comprising:
a strip defining a closed slot having an upper end and a lower end and an opened slot;
upper and lower rivet-shaped elements being fixed to said upper end of said post, said upper rivet-shaped element being received in said closed slot, said lower rivet-shaped element being received in said opened slot when said upper end of said closed slot rests on said upper rivet-like element and being released from said opened slot when said lower end of said closed slot contacts said upper rivet-shaped element, thereby allowing said supporting assembly to pivot about said upper rivet-shaped element;
an upper frame linked to said upper ends of said posts for carrying a gas burner and a barbecue grill; and
a base comprising:
a first plate having an inner rim and an outer rim pivotally linked to said lower ends of said first set of posts; and
a second plate having an inner rim pivotally linked to said inner rim of said first plate and an outer rim pivotally linked to said lower ends of said second set of posts.

* * * * *